United States Patent [19]

Cankurt et al.

[11] 4,286,970
[45] Sep. 1, 1981

[54] REACTOR WITH PARTICULATE RECYCLING FILTRATION MEANS

[75] Inventors: Nurettin T. Cankurt; Anthony H. Furman, both of Schenectady, N.Y.

[73] Assignee: General Electric Company, Schenectady, N.Y.

[21] Appl. No.: 134,068

[22] Filed: Mar. 26, 1980

[51] Int. Cl.³ .......................... C10J 3/20; C10K 1/02
[52] U.S. Cl. ........................................ 48/87; 48/128;
55/385 D; 422/129; 422/232
[58] Field of Search ................... 48/87, 128; 422/232,
422/129, 147; 110/217; 55/385 D, 430

[56] References Cited

U.S. PATENT DOCUMENTS

| 1,077,947 | 11/1913 | Abrames et al. | 55/430 |
| 2,816,519 | 12/1957 | Henderson | 110/217 |
| 4,150,953 | 4/1979 | Woodmansee | 48/71 |
| 4,162,148 | 7/1979 | Furstenberg | 55/430 |
| 4,212,653 | 7/1980 | Giles | 55/1 |

FOREIGN PATENT DOCUMENTS 867876 12/1941 France ........................................ 48/128

OTHER PUBLICATIONS

U.S. Dept. of Interior Bureau of Mines Information Circular I.C. 7415, Boyd (Director), FIG. 6, Nov. 1947.

Primary Examiner—Peter F. Kratz
Attorney, Agent, or Firm—Robert T. Schroeder; James C. Davis, Jr.; Paul R. Webb, II

[57] ABSTRACT

Particulates are both filtered from a product stream and recycled to an associated reactor by a filtration means disposable in a product stream outlet port of the reactor.

9 Claims, 2 Drawing Figures

1

REACTOR WITH PARTICULATE RECYCLING FILTRATION MEANS

BACKGROUND OF THE INVENTION

This invention relates generally to a means for the filtration of a particulate-laden fluid, and more particularly, to a means for filtering such a fluid and returning the filtered particulates to an associated reactor vessel without external handling.

Raw product gases leaving a reactor vessel such as a coal gasifier often contain many impurities which must be removed prior to the gas end use. In particular, product gas leaving a coal gasifier typically contains entrained coal fines and condensible constituents such as vaporized tar which must be removed prior to an end use for the gas such as in a gas turbine in an integrated coal fired plant. Various systems have been proposed for the removal of the entrained coal fines including a gas quench system such as that included in the coal gasification power plant described in U.S. Pat. No. 4,150,953 (Woodmansee). Another proposed approach is the use of a high temperature cyclone such as described in copending U.S. pat. application Ser. No. 919,460 (Giles) filed June 27, 1978 now U.S. Pat. No. 4,212,653 and assigned to the assignee hereof. Once they are removed, the coal fines are preferably recycled back to the gasifier for a more efficient utilization of coal resources.

In a quench system hot raw gas is cooled by direct contact with a water spray. A certain portion of the tar vapor is condensed by this cooling process, and this condensed with some water and most of the coal fines is removed from the gas in the form of a suspension herein referred to as "sludge". The removal of this sludge from a quench vessel is complicated by the fact that the sludge is viscous and thus adheres to and fouls valves, pumps, and pipes with which it comes into contact. This problem is aggravated during a plant startup from a cold condition since any solidified sludge in an associated cleanup system must first be liquified by the addition of heat before the plant is fully operable. Moreover, since the coal fines are relatively small and light some of the fines may remain suspended in the water which is conventionally recycled back to the quench through a recirculation system where these suspended fines may cause additional plugging.

In contrast to gas quench systems, cyclone separators are capable of operating at temperatures in excess of the tar condensation temperature and thereby avoid the problems associated with handling viscous tars. Additionally, cyclone separation enables a separate removal of particulates and a later removal of tars which may be advantageous in the maintenance of prescribed tar and coal fines feed ratios into a recycling system such as the extruder disclosed in U.S. Pat. Nos. 4,049,390 and 4,049,392 (Furman).

However, cyclone separators have encountered operating problems including erosion and plugging of the outlet cone. For example, cyclone separators during a startup from a cold condition initially operate at a temperature below the tar condensation temperature, potentially resulting in plugging and fouling of the cyclone by condensed tar. Furthermore, the beneficial recycling of coal fines to achieve a more efficient coal utilization still requires additional external handling whether they are recycled from a cyclone separator or from a gas quench system. This external handling necessarily results in increases in both manpower and equipment as well as in the increased potential for detrimental fouling, plugging and erosion.

Accordingly, it is an object of the present invention to provide a new improved means for the filtration of particulates from a raw fluid stream.

Another object of the present invention is to provide a means for filtering particulates from raw coal gas in the absence of condensed tar.

Still another object of the present invention is to enable the recycling of particulates to the reactor vessel without external handling.

SUMMARY OF THE INVENTION

The above objects and advantages are achieved in a particulate recycling filtration means including an at least partially fluid-permeable tubular member having an auger rotatably mounted therein and which is positioned in and spaced from at least a portion of an outlet port of a reactor vessel. A fluid barrier is provided in the space intermediate the port and the tubular member adjacent the inboard ends thereof to constrain fluid entering the outlet port to a flow path into the tubular member, and a means is provided for restricting the flow of fluid out of the outboard end of the tubular member. In a preferred embodiment of the present invention a second flow restricting means is also provided between the tubular member and the port at the outboard ends thereof, with means also being provided for selectively controlling the flow of fluid through these two flow restricting means.

BRIEF DESCRIPTION OF THE DRAWING

For better understanding of the present invention reference may be had to the accompanying drawing wherein.

DESCRIPTION OF THE INVENTION

Figure 1:
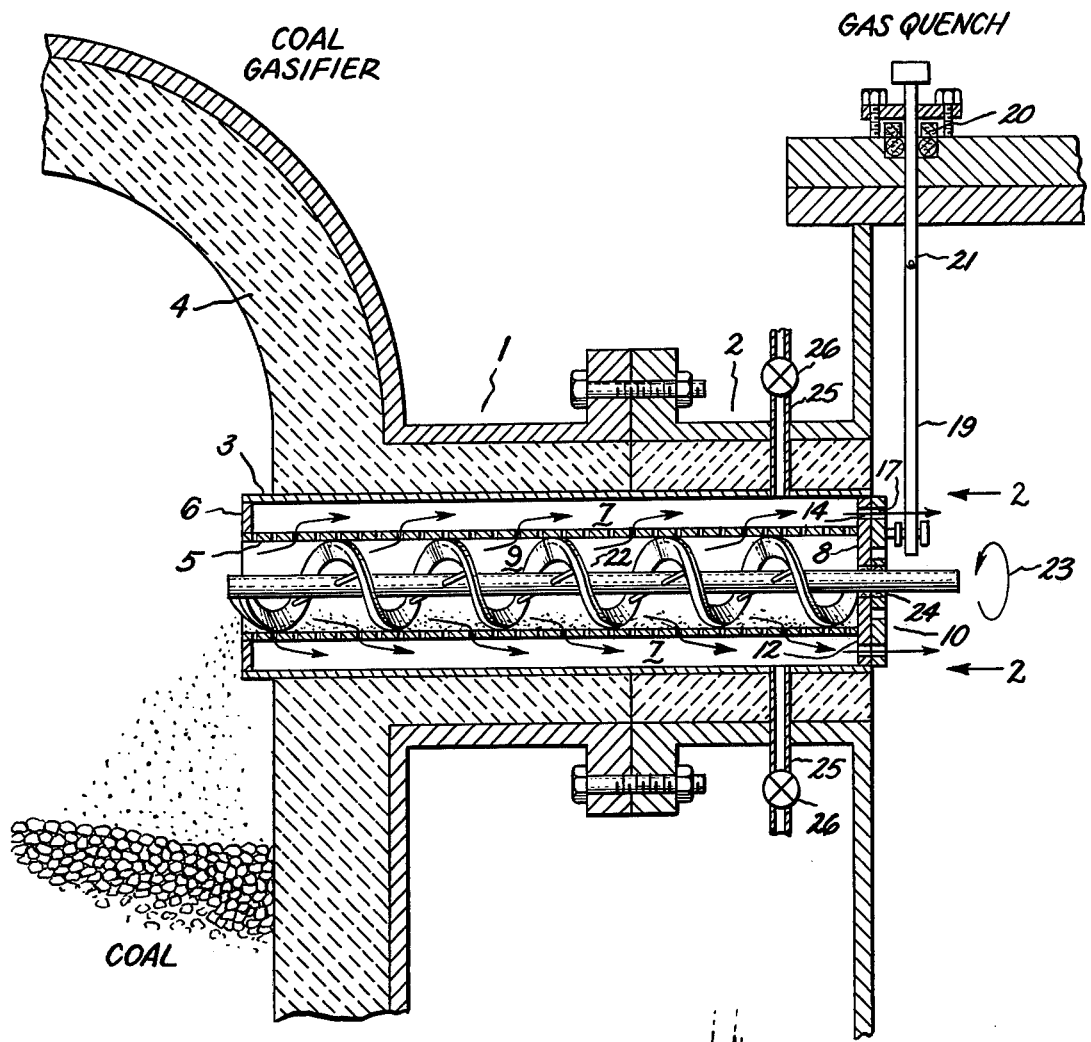
FIG. 1 is a partially sectioned view of a particulate recycling filtration means constructed in accordance with an embodiment of the present invention and positioned in the gas flow path between a coal gasifier and a gas quench vessel.

As illustrated in FIG. 1 an outlet port 1 of a coal gasifier reactor vessel is connected to an inlet port 2 of a gas quenching system to thereby enable the passage of raw gases from the gasifier to the gas quench system. The outlet port 1 may beneficially include a liner 3 so as to protect the refractory material 4 of the port, as well as to facilitate the removal of the particulate filtering means for maintenance.

A tubular member 5 is positioned in the port 1 in a spaced relationship with the liner 3. The tubular member is permeable to fluids of interest but substantially impermeable to particulates for at least a portion of its length, and preferably for its entire length so as to present a greater effective filtration area. In a preferred embodiment of this invention the tubular member is a porous pipe such as commercially available from the Mott Metallurgical Corporation of Farmington, Connecticut. Although not limited thereto, in the example herein described for the filtration of coal fines the pores of the tubular member are preferably less than 30 microns and most preferably less than 10 microns in size in order to filter the coal fines without unduly restricting the flow of gases therethrough.

In order to constrain the raw gases exhausted through the port 1 to pass through the tubular member 5 the inboard end of the region between the liner 3 and the tubular member 5 is suitably sealed by a fluid barrier 6 such as an annular spacer to thereby define a volume 7. As used herein, the terms "inboard" and "outboard" signify directions into and out of the gasifier, respectively.

Means 8 are also required at a point adjacent the outboard end of the porous portion of the tubular member 5 to restrict the flow of unfiltered fluid out of the interior region 9 of the tubular member. In this manner the raw gases entering the tubular member are forced to flow through the porous portion thereof to thereby effect a filtration of the raw gas. This flow restricting means 8 may simply be a fluid barrier such as a solid metal plate suitably affixed to the outboard end of the tubular member 5. However, during a startup of the particulate filtration means from a cold condition it is desirable to provide a means for selectively exhausting raw gas directly from the tubular member without filtration to avoid clogging the fluid-permeable portion of the tubular member with tars which are condensible at such a reduced temperature. For example, this means might include a conduit and an associated valve in flow communication with the tubular member interior 9. However, it is similarly desirable to restrict the flow of fluids from the volume 7 between the tubular member 5, the port liner 3 and the fluid barrier 6 during such a startup period to effectively eliminate flow through the cool fluid-permeable portion of the tubular member and to thereby force the gas to flow out of the tubular member without filtration.

Accordingly, in a preferred embodiment of this invention means are provided adjacent the outboard end of the fluid-permeable portion of the tubular member 5 to enable the selective restriction of unfiltered fluid flowing from the interior 9 of the tubular member 5 and of filtered fluid flowing from the volume 7 between the tubular member 5, the fluid barrier 6 and the port liner 3. Although not limited thereby, in the preferred embodiment of this invention illustrated in FIG. 1 and detailed in FIG. 2 both of these means for selectively restricting the flow of fluid are included in a single bypass flow device 10.

The bypass flow device 10 includes a circular plate 12 which is sealed to the outboard end of the tubular member 5 and of the port liner 3. Fluid passageways 13 and 14 which are in flow communication with tubular member interior 9 and the volume 7, respectively, are provided in the plate 12. A second plate 15 is rotatably mounted concentrically with the first plate 12. A plurality of fluid passageways 16 and 17 in the plate 15 are located at predetermined positions alignable with the fluid passageways 13 and 14, respectively. A tab 18 is connected to the plate 15 and to an actuator pole 19 for the remotely actuated rotation of the plate 15 to enable a selective alignment or mis-alignment of the fluid passageways 13 and 16 or 14 and 17 respectively, depending upon the mode of operation required as described in detail hereinbelow. Suitable packing 20 and a flexible joint 21 are provided to allow movement of the actuator pole 19 without a loss of pressure from the gas quench system.

An auger 22 is rotatably positioned within the tubular member 5. The auger 22 is a conventional "ribbon" type having an open central portion to facilitate the distribution of raw gases through the tubular member 5. The auger 22 is sized sufficiently with respect to the tubular member 5 such that upon rotation of the auger in the direction indicated at 23 filtered particulates are removed from the porous region of the tubular member and returned to the reactor vessel. Suitable packing 24 is provided about the shaft of the auger 22 to maintain the integrity of the axial fluid seal for the tubular member interior 9 as provided by the selected mis-alignment of fluid passageways 13 and 16 of the bypass flow device 10. Of course, support means may be provided for the auger to minimize wear of the tubular member 5. For example, a suitably sized wear ring of conventional design may be fastened to the interior of the tubular member 5 adjacent the inboard end thereof.

Means are also provided as indicated in FIG. 1 for the admission of purge fluid into the region 7. To provide a more uniform purge this means may include a plurality of conduits 25 and associated valves 26 in flow communication with the volume 7 and spaced about the circumference of the liner 3. To facilitate the removal of liner 3 as for maintenance the conduits 25 are preferably not directly joined to the liner but terminate adjacent apertures provided therein.

In operation a typical gasifier produces raw gas at approximately 1000° F. and 300 psi which gas is exhausted according to the present invention through a particulate recycling filtration means wherein coal fines are removed from the raw gas before it is passed to the gas quench system. More particularly, raw gas enters the inboard end of the tubular member 5 with the gaseous portion thereof passing through the fluid permeable portion of the tubular member and into the volume 7. The filtered gases are exhausted from the volume 7 through the aligned fluid passageways 14 and 17 as illustrated in FIG. 1. Coal fines and other particulates too large to pass through the porous portion of the tubular member are collected in the interior region 9. The rotating auger 22 collects these particulates and transfers them back to the gasifier vessel for additional reaction therein.

Figure 2:
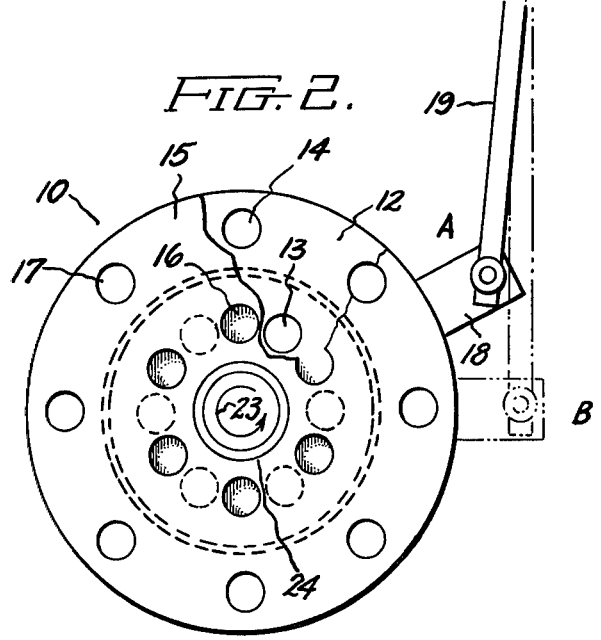
FIG. 2 is a view partially in phantom of a bypass flow device of the particulate filtration means of FIG. 1 taken along the line 2—2 and looking in the direction of the arrows.

During normal operation, the particulate filtering means operates at temperatures sufficiently high to avoid the formation of condensed tar which might otherwise clog the pores in the tubular member 5. However, during a startup situation the particulate filtering means may be sufficiently cold to cause the condensation of tar vapor passing therethrough. Accordingly, the actuator 19 of the bypass flow device 10 is moved to reposition the tab 18 from position A to a position B as indicated in FIG. 2. This movement causes the plate 15 to rotate so as to mis-align the fluid passageways 14 and 17 to thereby restrict the flow of fluid from the volume 7. Similarly, passageways 13 and 16 are thereby aligned to allow unfiltered raw gas to flow directly out of the tubular member interior 9. After a sufficient period of preheating the tab 18 is repositioned from position B to A to thereby restrict the flow of fluid through the outboard end of the tubular member 5, thereby forcing the raw gas to be channeled through the fluid permeable portion of tubular member where it is filtered before being exhausted through the re-aligned fluid passageways 14 and 17.

Periodically, it may be necessary to clean the fluid permeable portion of the tubular member 5. This may be accomplished by forcing hot purging fluid to flow through the fluid permeable portion in a direction opposite to the normal flow path. Accordingly, tab 18 is moved to position B to restrict the flow of fluid from the volume 7. Valves 26 are opened to allow purging fluid to flow into the volume 7 and through the pores in the tubular member 5. The resultant fluid may either flow into the gasifier or into the gas quench system through the aligned passageways 13 and 16.

The above-described embodiment of this invention is intended to be exemplitive only and not limiting and it will be appreciated from the foregoing by those skilled in the art that many substitutions, alterations and changes may be made to the enclosed structure with department from the spirit or the scope of the invention.

What we claim as new and desire to be secured by Letters Patent of the United States is:

1. In a reactor vessel for generating a product fluid, a particulate recycling filtration means comprising:
   a port in said vessel for exhausting product fluid therefrom;
   a tubular member positioned within at least a portion of said port in spaced relationship therewith;
   a fluid-permeable portion of said tubular member which is substantially impermeable to particulates and which has an inboard and an outboard end;
   a fluid barrier disposed intermediate said port and said tubular member adjacent the inboard end of said fluid-permeable portion so as to define a volume between said port and said tubular member;
   a means connected to said tubular member adjacent the outboard end of said fluid-permeable portion for restricting the flow of fluid out of the outboard end of said tubular member; and
   a means cooperating with said tubular member for removing particulates therefrom; wherein said fluid-permeable portion is a porous tube having pores sufficiently small to filter particulates of interest without unduly restricting the flow of fluid therethrough; and wherein said means for removing particulates from said tubular member is a ribbon auger rotatably mounted in said tubular member for recycling the particulates to the reactor vessel.

2. A reactor vessel as in claim 1 wherein said port includes a liner, and said tubular member is positioned in spaced relationship with said port liner.

3. A reactor vessel as in claim 2 further comprising a means in flow communication with the interior of said tubular member for selectively exhausting said product fluid from the tubular member interior without filtration.

4. A reactor vessel as in claim 1 wherein said means for restricting the flow of fluid out of the outboard end of said tubular member includes a fluid barrier affixed to said tubular member adjacent the outboard end of said fluid-permeable portion, at least one fluid passageway through said fluid barrier, and a means selectively engageable with said fluid passageway for preventing the flow of fluid therethrough.

5. A reactor vessel as in claims 3 or 4 further comprising a means in flow communication with said volume intermediate said port and said tubular member for restricting the flow of fluid exhausted from said volume.

6. A reactor vessel as in claims 1, 3 or 4 further comprising a means in flow communication with said volume intermediate said port and said tubular member for restricting the flow of fluid exhausted from said volume, and a means for selectively admitting purging fluid into said volume.

7. A reactor vessel as in claim 5 wherein said means for restricting the flow of fluid exhausted from said volume is disposed intermediate said port and said tubular member adjacent the outboard end of said fluid-permeable portion.

8. A reactor vessel as in claim 1 wherein said fluid-permeable portion extends for substantially the entire length of said tubular member.

9. A reactor vessel as in claim 1 wherein said pores are no greater than 30 microns in size.

* * * * *